Figure 1:
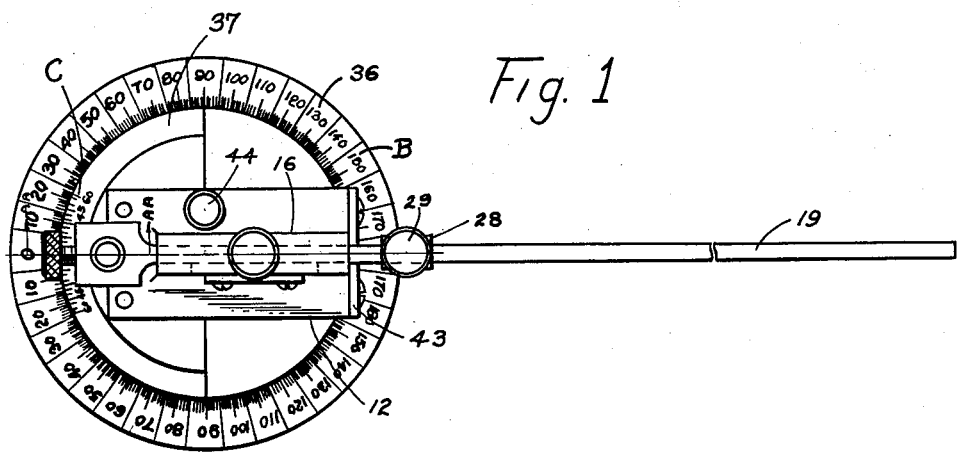

July 10, 1951  J. W. JOSEPH  2,559,966
LAYOUT VERNIER

Filed June 13, 1949  2 Sheets-Sheet 1

John W. Joseph
INVENTOR.

BY
Kimmel & Crowell
Attys.

July 10, 1951     J. W. JOSEPH     2,559,966
LAYOUT VERNIER

Filed June 13, 1949     2 Sheets-Sheet 2

John W. Joseph
INVENTOR.

BY
Kimmel & Crowell
Attys.

Patented July 10, 1951

2,559,966

UNITED STATES PATENT OFFICE 2,559,966

LAYOUT VERNIER

John W. Joseph, Bronx, N. Y.

Application June 13, 1949, Serial No. 98,788

1 Claim. (Cl. 33—26)

This invention relates to a device to be used by tool and die makers and machinists for the purpose of assisting them in achieving accurate layout work, and more specifically to a layout vernier for that purpose.

An object of this invention is to provide a device for accurately laying out points on a plane surface relative to a starting point or edge thereon. The device is effective for locating the center punch for holes to be drilled in the plate, for scribing either arcuate or straight lines, for relocating the centers of holes drilled in a plate, and finally for measuring both the thickness and length of pieces of material.

A further object of this invention is to provide an accurate layout tool for tool and die makers and machinists which embodies both linear and angular vernier adjustment.

Still another object of this invention is to provide a layout vernier which includes an assembly for accurately measuring linear distances, which assembly may be used alone or in conjunction with a base composed of rotatable portions for the purpose of laying out angular relationships.

To the foregoing objects and others which may hereinafter more fully appear, the invention consists of the novel construction, combination and arrangement of parts as will be more specifically referred to and illustrated in the accompanying drawings and specification, but it is understood that changes, variations and modifications may be resorted to which fall within the scope of the appended claim.

Figure 2:
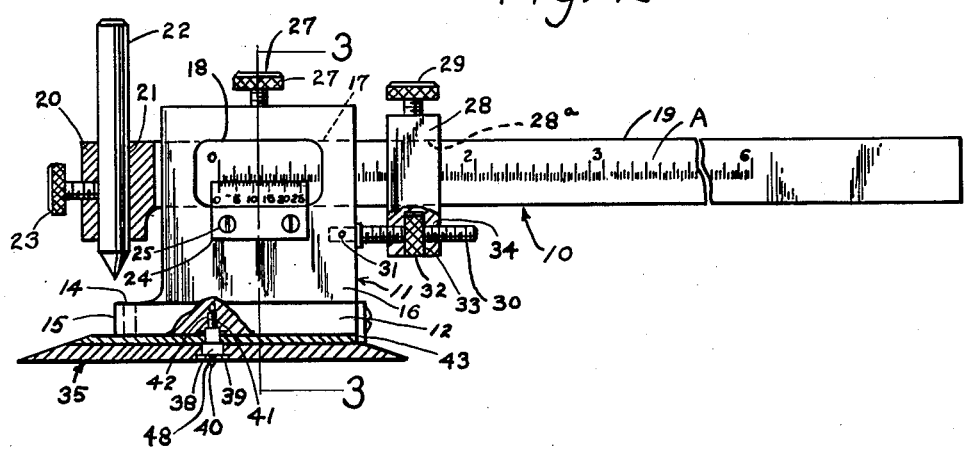
Figure 3:
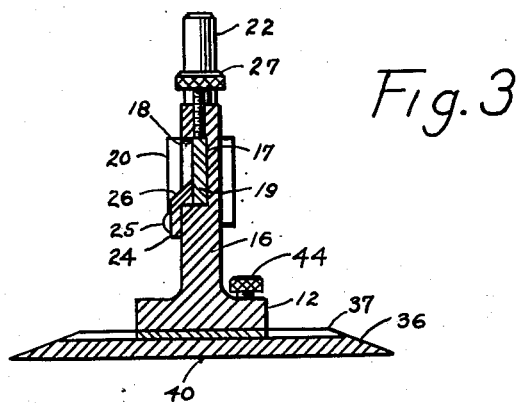
Figure 4:
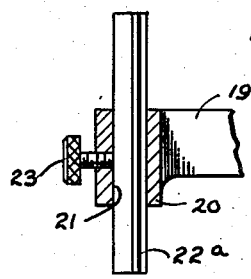
Figure 5:
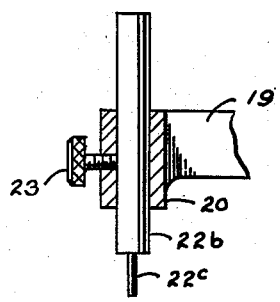
Figure 6:
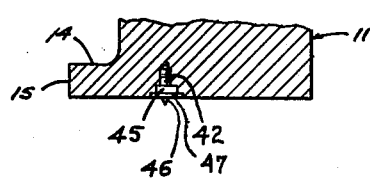
Figure 7:
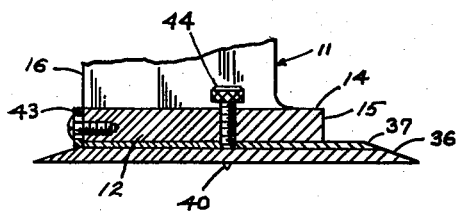

In the drawings:

Figure 1 is a plan view of a device constructed according to an embodiment of my invention, Figure 2 is a side elevation of the device partly broken away and partly in section, Figure 3 is a transverse section taken on the line 3—3 of Figure 2, Figure 4 is a fragmentary side elevation partly in section of a portion of the device showing a plate thickness measuring attachment installed, Figure 5 is a view similar to that in Figure 4, but showing a hole relocating attachment installed, Figure 6 is a fragmentary longitudinal section through the center of the standard and showing the base portion removed and a center punch engaging pin installed in the standard; and Figure 7 is a fragmentary side elevation partly in section from the opposite side as that in Figure 2, and showing the means provided for locking the standard relative to the base.

Referring to the drawings and specifically to Figures 1 and through 3 thereof, a layout vernier is there illustrated which is constructed according to an embodiment of my invention. The layout vernier is generally indicated by the reference numeral 10 and includes a standard 11. The standard 11 consists of a flat base portion 12, having a forward end 14 extending forwardly of the standard and provided with a right angularly machined face 15.

Rising from the base 12 is a body portion 16 having a longitudinally extending slot 17 extending therethrough. An opening 18 generally rectangular in form extends through one side wall of the body portion 16 and communicates at its inner end with the horizontal slot 17. An elongated rectangular rod 19 is slidably carried within the slot 17.

The member 19 is provided with a calibrated scale indicated by the letter A, which scale in this embodiment is a succession of inches divided into twenty-five one-thousandths. The forward end 20 of the member 19 is enlarged and is provided with a vertical bore 21 extending therethrough. The vertical bore 21 is adapted to slidably receive a center punch tool 22, as indicated in Figure 2, or a tool 22a, for determining the thickness of a plate as hereinafter set forth, as shown in Figure 4, or a hole center relocating tool 22b, as shown in Figure 5.

A set screw 23 engages through said enlarged portion 20 and extends into the bore 21 for the purpose of locking the tool 22 within the enlarged portion 20. A plate 24 is secured along the lower edge of the opening 18 by means of the fastening members 25. This plate 24 is bent inwardly along the upper edge, as at 26 and best seen in Figure 3, so as to be disposed in close proximity to the adjacent face of the calibrated rod or member 19. This plate 24 along its upper edge is provided with a calibrated vernier scale, the graduations of which have a spacing of twenty-four one-thousandths of an inch.

A set screw 27 extends downwardly through the top of the standard 16 and is adapted to engage the top of the member 19 for locking the member 19 relative to the standard. A traveller block 28 having a slot 28a extending therethrough is mounted slidably upon the member 19. This traveller block 28 is provided with a set screw 29 at the top thereof and adapted when depressed to engage the top of the member 19 for preventing sliding movement of the traveller block relative to the member 19.

A bolt member 30 extends rearwardly from the rear end of the standard 16 and is held against rotation relative to the standard by means such as the pin 31. A nut member 32 threaded upon the bolt 30 is disposed within a downwardly opening slot 33 formed in the bottom of the traveller block 28. The bolt 30 slidably extends through a horizontal bore 34 extending through the bottom of the traveller block so that when the nut 32 is rotated on the bolt 30, the traveller block 28 will be caused to travel horizontally relative to the standard 16.

A removable base generally indicated by the reference numeral 35 is provided. This base 35 consists of a disc-shaped bottom portion 36 and an upper portion 37 which is rotatable upon the disc 36. The upper portion 37 is rotatably mounted on the disc 36 by means of the lug member 38. The lug member 38 is provided with a shoulder 39 at the bottom thereof, formed with a center punch engaging pin 40 on the bottom surface thereof. A screw 41 is formed on the top of the stud and is adapted to threadably engage within the threaded opening 42 formed in the base 12 of the standard 11. A depending plate 43 is carried by the rear surface of the base 12 of the standard and is adapted to be moved vertically relative thereto. When in the lowermost position, the bottom of the plate 43 will overhang the straight rear edge of the upper portion 37 of the base so as to prevent rotation of the standard relative to the upper portion of the base. This construction results in both the upper portion 37 of the base and the standard 11 being rotatable together relative to the disc 36.

The disc 36 is provided with a scale calibrated in degrees and referred to by the letter B, and the upper portion of the base 37 is provided with a vernier scale C which indicates minutes so that an accurate angular relationship can be set between the standard 11 and the bottom disc 36. A set screw 44 extends downwardly through the base 12 of the standard and is adapted to engage the top surface of the disc 36 so as to lock the standard and upper portion 37 of the base against rotation relative to the disc 36.

When it is desired, the base 35 can be removed from the standard by unscrewing the threaded screw 41 from the tapped hole 42 in the base of the standard. A pair of diametrically opposed openings 48 are formed in the base 39 to receive an Allen wrench for such removal. A filler plug 45, as shown in Figure 6, may then be threaded into the opening 42 and is formed with wrench receiving openings 47 for this purpose. The plug 45 is also provided with a center punch engaging pin 46 for the purpose hereinafter disclosed.

In the operation of my layout vernier, the base 35 is placed upon the plate or sheet of metal upon which it is desired to lay out center punches or scribe lines for holes to be drilled. If there is a beginning center punch on the plate, the pin 40 is engaged therein and the scale B on the disc 36 is aligned with a machined edge of the plate upon which the layout is to be made. By loosening the set screw 44 the standard may be rotated relative to the disc 36 of the base so as to set up any desired angular relationship between the rod 19 and the reference line. The set screw 27 and the set screw 29 are then loosened so that the member 19 is slidable relative to the standard, and the center punch supporting end of the member 19 is moved outwardly until it is indicated to be approximately at that point where a center punch is desired to be made.

Then the set screw 29 is locked and by the operation of the nut 33 on the bolt 30, a fine adjustment of the member 19 relative to the standard may be possible.

In laying out measurements to an accurate degree, the vernier on the plate 24 is used in conjunction with the scale A on the member 19 in the well known manner. When the center punch 22 is indicated to be in the desired position, the set screw 23 is released so as to provide for sliding of the punch relative to the end 20 of the member 19 and the punch 22 is then struck with a hammer so as to make an indentation in the lay out plate.

When it is desired to use this device for the purpose of measuring the thickness of sheets of material, the cylinder rod 22a is installed in the bore 21 and locked in place by means of the set screw 23. The bottom end of the cylindrical rod 22a is disposed at a position adjacent to the surface 15 of the base 12 of the standard 11. The member 19 is then slid to the right as viewed in Figure 2, until the side of the cylindrical rod 22a abuts the surface 15 and the reading is taken. The sheet of material whose thickness is to be determined is then inserted between the surface 15 and the side of the rod 22a and the difference between the reading so determined and the original reading will represent the thickness of the material.

In relocating the centers of holes, the tool 22b is used. This tool is provided with a depending reduced diameter portion 22c on the bottom thereof, which portion is engaged against the side of the hole and a measurement made from that point to the edge of the plate which is abutting the surface 15. A similar measurement is then made from an edge of the plate at right angles to the first datum edge and since the diameter of the hole is either known or can easily be determined, these two measurements being a simple mathematical process can be used to determine the position of the center of the hole.

My lay out vernier may also be used as a height gauge. For this purpose the plate 43 and the base 35 are removed from the standard. The work to be laid out is placed on a surface plate, and the back edge of the standard base portion 12 is also positioned on the surface plate with the body portion 16 extending over the edge of the surface plate. The member 19 will then be disposed in a vertical position and the center punch 22 will horizontally extend towards the work. The lay out vernier can then be used in the conventional manner to measure vertical distances on the work.

The foregoing illustrates a preferred embodiment of my invention. However, it is understood that I may not be limited thereto except as provided in the appended claim.

What I claim is:

A layout vernier comprising a base member including a lower calibrated disc, a center punch on the under side of said disc, and an upper disc segment rotatably mounted thereon and having a vernier scale, a vertical standard secured to said upper disc segment and having a longitudinally extending horizontal slot therethrough, threaded means detachably connecting said base to said standard, a transverse opening communicating with said slot, an elongated rectangular rod having a calibrated scale therein slidably carried within said slot, a calibrated plate in said opening cooperating with the calibrations on said scale, an enlarged end on said rod having a vertical bore therethrough, means embodying a set screw releasably securing a selected tool in said bore and vernier means for moving said rod, said vernier means including a traveller block having a slot therethrough through which said rod extends, a bolt secured to said standard, a nut carried by said block engaging said bolt and means for locking said rod in said last mentioned slot whereby movement of said block moves said rod, means for locking said rod against movement in said first mentioned slot and means embodying a set screw for locking said upper disc segment against rotation relative to said lower disc.

JOHN W. JOSEPH.

REFERENCES CITED

The following references are of record in the file of this patent:

UNITED STATES PATENTS

| Number | Name | Date |
|---|---|---|
| 416,097 | Dyar | Nov. 26, 1889 |
| 1,005,992 | McMurray | Oct. 17, 1911 |
| 1,191,906 | Miller | July 18, 1916 |
| 1,298,866 | Beach | Apr. 1, 1919 |
| 1,417,878 | Abare | May 30, 1922 |
| 2,191,396 | Nomura | Feb. 20, 1940 |
| 2,325,558 | Uslan | July 27, 1943 |
| 2,341,418 | Atkins | Feb. 8, 1944 |
| 2,404,858 | McLaren | July 30, 1946 |
| 2,470,458 | Barr | May 17, 1949 |

FOREIGN PATENTS

| Number | Country | Date |
|---|---|---|
| 546,190 | Great Britain | July 1, 1942 |